(12) United States Patent
McKee

(10) Patent No.: US 6,694,457 B2
(45) Date of Patent: Feb. 17, 2004

(54) SYSTEM AND METHOD FOR MONITORING EXECUTION OF PRIVILEGED INSTRUCTIONS

(75) Inventor: Bret A. McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 09/799,999

(22) Filed: Mar. 6, 2001

(65) Prior Publication Data

US 2002/0129299 A1 Sep. 12, 2002

(51) Int. Cl.$^7$ ................................................ G06F 11/00
(52) U.S. Cl. ........................................ 714/38; 712/244
(58) Field of Search ............................ 714/38, 34, 35, 714/28, 45, 37; 712/244, 245, 227, 229

(56) References Cited

U.S. PATENT DOCUMENTS

| | | | | | |
|---|---|---|---|---|---|
| 4,809,160 | A | * | 2/1989 | Mahon et al. | 713/200 |
| 5,134,701 | A | | 7/1992 | Mueller et al. | |
| 5,201,043 | A | * | 4/1993 | Crawford et al. | 714/49 |
| 5,371,879 | A | * | 12/1994 | Schiffleger | 703/26 |
| 5,450,586 | A | | 9/1995 | Kuzara et al. | |
| 5,465,335 | A | | 11/1995 | Anderson | |
| 5,596,717 | A | * | 1/1997 | Marshall, Jr. | 714/53 |
| 5,742,755 | A | * | 4/1998 | Hervin | 714/53 |
| 5,815,702 | A | * | 9/1998 | Kannan et al. | 712/244 |
| 5,859,991 | A | * | 1/1999 | Narayan | 712/204 |
| 5,889,978 | A | * | 3/1999 | Jayakumar | 703/27 |
| 5,915,114 | A | | 6/1999 | McKee et al. | |
| 6,199,181 | B1 | * | 3/2001 | Rechef et al. | 714/38 |
| 6,240,531 | B1 | * | 5/2001 | Spilo et al. | 714/38 |
| 6,397,242 | B1 | * | 5/2002 | Devine et al. | 709/1 |
| 6,516,395 | B1 | * | 2/2003 | Christie | 711/163 |

OTHER PUBLICATIONS

Hewlett–Packard Product Manual, "Overview of IA–64 Architecture".
Hewlett–Packard Product Manual, "IA–64 Software Conventions and Runtime Architecture", Version 1.0 (Aug. 31, 1999).
Intel Product Manual, "Intel IA–64 Architecture Software Developer's Manual", vol. 1: IA–64 Application Architecture, Revision 1:1 (Jul. 2000).
Intel Product Manual, "Intel IA–64 Architecture Software Developer's Manual", vol. 2: IA–64 System Architecture, Revision 1.1 (Jul. 2000).
Intel Product Manual, "Intel IA–64 Architecture Software Developer's Manual", vol. 3: IA–64 Instruction Set Reference, Revision 1.1 (Jul. 2000).
Intel Product Manual, "Intel IA–64 Architecture Software Developer's Manual", vol. 4: Itanium Processor Programmer Guide, Revision 1.1 (Jul. 2000).
Intel Product Manual, "Intel IA–64 Architecture Software Developer's Manual", Itanium Processor Microarchitecture Reference for Software Optimization (Aug. 2000).

* cited by examiner

Primary Examiner—Nadeem Iqbal

(57) ABSTRACT

A system monitors the execution of privileged instructions by a processor of a computer system. The processor includes a current privilege level. The processor automatically generates a fault when attempting execution of an instruction requiring a higher privilege level than the current privilege level of the processor. The current privilege level of the processor is raised in response to a fault generated by a first faulting instruction. The first faulting instruction is executed. A trap is generated by executing the first faulting instruction. The current privilege level of the processor is lowered in response to the trap.

32 Claims, 4 Drawing Sheets

SYSTEM AND METHOD FOR MONITORING EXECUTION OF PRIVILEGED INSTRUCTIONS

THE FIELD OF THE INVENTION

The present invention relates to monitoring the execution of privileged instructions in computer systems, and more particularly to monitoring the execution of privileged instructions in computer systems using hardware single-stepping.

BACKGROUND OF THE INVENTION

Computer systems include at least one processor and memory. The memory stores application program instructions, data, and an operating system. The operating system controls the processor and the memory for system operations and for executing the application program instructions. Processors often have a current privilege level which controls the application instruction execution in the computer system by controlling accessibility to system resources, such as system registers, system instructions, and system memory pages. The current privilege level varies between two or more execution privilege levels.

Sometimes it is desirable to run as an unprivileged application a program that was originally intended to run as a privileged application. Such an application is referred to herein as a privilege desiring application. It would be desirable to monitor, count and trace the execution of privileged instructions in a privilege desiring application. One current solution for monitoring the execution of instructions in a program is to build a software emulator to handle faulting instructions so that execution can continue when a fault occurs. However, this solution is very complex, and requires software to be developed that can update the processor state as if a faulting instruction had been executed.

Software debuggers have also been developed to monitor the execution of program instructions. Software debuggers typically make use of a single-step feature. A single-step feature may be implemented in software, or may be a hardware feature provided by the processor. A single-step feature has been used by software debuggers to step through a program one instruction at a time, monitor how the processor state changes after each instruction, and identify errors based on the changes in the processor state. A hardware single-step feature has not previously been used as part of a solution for monitoring, counting, and tracing the execution of privileged instructions in a privilege desiring application.

It would be desirable to provide a simplified solution for monitoring, counting and tracing the execution of privileged instructions in a privilege desiring application, without the requirement of building a complex software emulator.

SUMMARY OF THE INVENTION

The present invention provides a computer system and method for monitoring the execution of privileged instructions by a processor of a computer system. The processor includes a current privilege level. The processor automatically generates a fault when attempting execution of an instruction requiring a higher privilege level than the current privilege level of the processor. The current privilege level of the processor is raised in response to a fault generated by a first faulting instruction. The first faulting instruction is executed. A trap is generated by executing the first faulting instruction. The current privilege level of the processor is lowered in response to the trap.

In one embodiment, the current privilege level of the processor is lowered before executing the instructions.

In one embodiment, a fault handler is invoked to process the fault. The step of raising the current privilege level is performed by the fault handler.

In one embodiment, a trap handler is invoked to process the trap. The step of lowering the current privilege level is performed by the trap handler.

In one embodiment, a single-step mode of the processor is enabled in response to the fault. The single-step mode is enabled by setting a field in a system register of the processor.

In one embodiment, state information is stored in response to the fault. The state information includes the number of instructions that caused a fault and an identification of instructions that caused a fault.

One form of the present invention provides a method of executing instructions by a processor of a computer system controlled by an operating system. The processor has a current privilege level. A privileged operation fault is generated based on the attempted execution of a first instruction. The current privilege level of the processor is raised in response to the privileged operation fault. A single-step mode is enabled in response to the privileged operation fault. The first instruction is executed, thereby generating a single-step trap. The current privilege level of the processor is lowered in response to the single-step trap. The single-step mode is disabled in response to the single-step trap.

One form of the present invention provides a computer system including a processor having a current privilege level that controls application instruction execution in the computer system. A memory stores a privilege desiring application program having application instructions. An operating system stored in the memory controls the processor. The operating system includes a fault handler and a trap handler. The fault handler raises the current privilege level and enables a single-step mode in response to a privileged operation fault. The trap handler lowers the current privilege level and disables the single-step mode in response to a single-step trap.

One form of the present invention provides a computer readable medium containing an operating system for controlling a processor of a computer system to perform a method of monitoring the execution of privileged instructions. The processor has a current privilege level that controls instruction execution in the computer system. The method includes raising the current privilege level of the processor in response to a fault generated by a first faulting instruction. The first faulting instruction is executed. A trap is generated by executing the first faulting instruction. The current privilege level of the processor is lowered in response to the trap.

The present invention provides a simplified solution for monitoring, counting and tracing the execution of privileged instructions in a privilege desiring application program. In one embodiment, a hardware single-step feature of a processor is used to temporarily grant privileges to particular instructions. Privileged instructions are "emulated" by the hardware itself, eliminating the need for building a complex software emulator.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
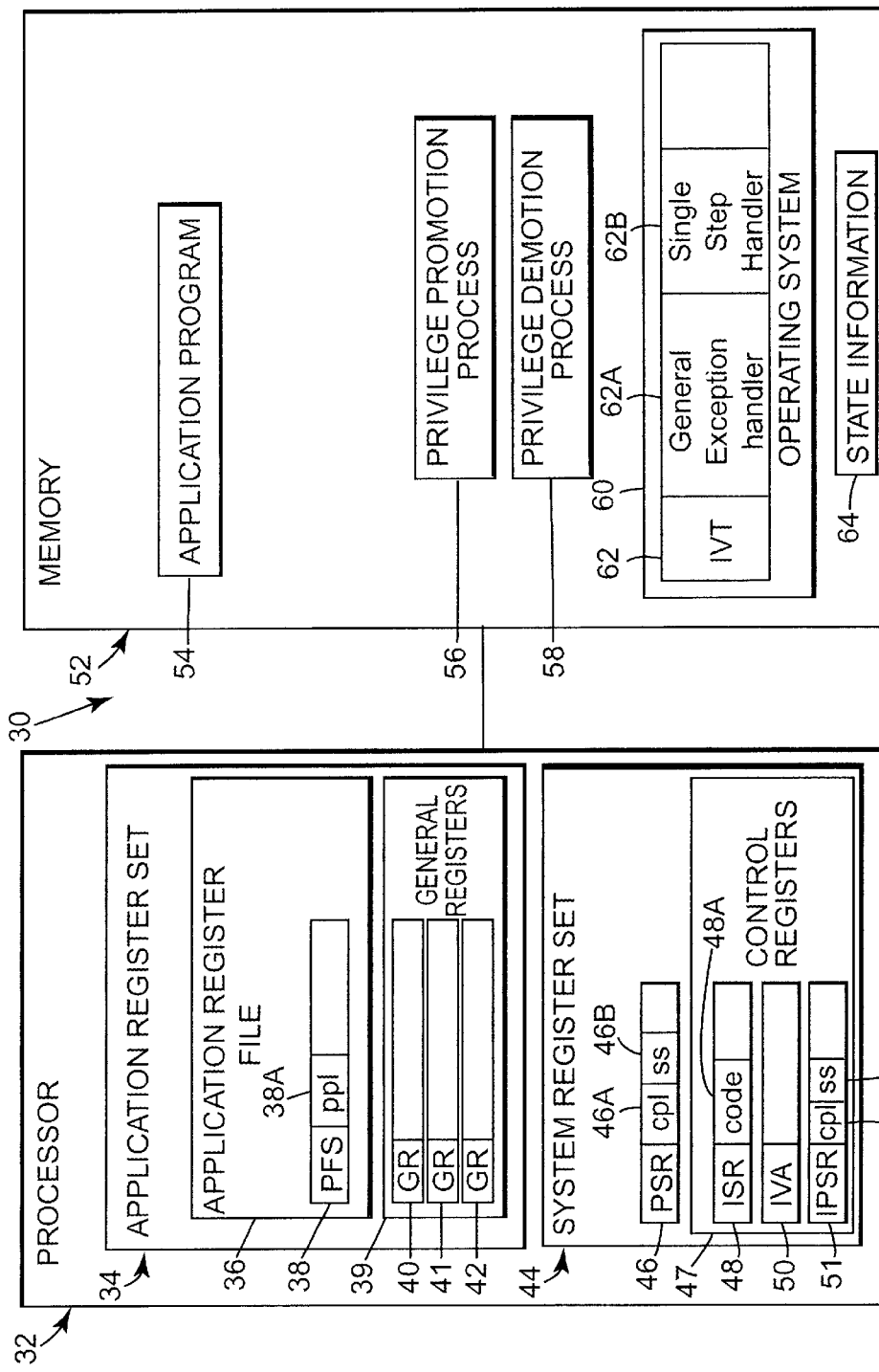
FIG. 1 is a block diagram of a computer system according to the present invention, which monitors the execution of privileged instructions.

A computer system according to the present invention is illustrated generally at 30 in FIG. 1. Computer system 30 includes at least one processor, such as processor 32, for performing sequences of logical operations. Computer system 30 also includes memory 52 for storing instructions and data for use by processor 32. An operating system 60 is stored in memory 52 and controls processor 32 and memory 52 for system operations and for executing application program instructions stored in memory 52. Memory 52 typically includes random access memory (RAM), non-volatile memory, and a hard disk drive, but can include any known type of memory storage.

Processor 32 includes an application register set 34 and a system register set 44. An architectural state of computer system 30 is represented by application register set 34, system register set 44, and memory 52. Application register set 34 includes registers available to application programs stored in memory 52. System register set 44 provides system register resources for process control, interruption handling, protection, debugging, performance monitoring, and the like. System register set 44 is generally only visible to operating system 60.

Example registers that can be included in application register set 34 include general registers, floating point registers, compare result registers, branching information registers, instruction pointer, current frame marker, process identifiers, and user mask. Application register set 34 includes an application register file 36. Application register file 36 includes special purpose data registers and control registers for application visible processor functions for application instructions. Application register file 36 includes a previous function state (PFS) register 38 having multiple fields that represent values copied automatically on a call instruction from a current frame marker register to accelerate procedure calling. PFS register 38 includes a previous privilege level field (PFS.ppl) 38A.

Application register set 34 also includes a general register file 39. General register file 39 includes a plurality of general registers. General register file 39 includes general registers 40, 41, and 42. General registers 40, 41 and 42 provide a resource for general-purpose computations. In one embodiment, general registers 40 and 41 are stacked general registers, which are local to each procedure and are made available by allocating a register stack frame consisting of a programmable number of local and output registers. In one embodiment, general register 42 is a static general register and is visible to all procedures.

Example registers that can be included in system register set 44 include region registers, protection key registers, debug break point registers, machine specific registers, and control registers. System register set 44 includes a processor status register (PSR) 46, which maintains control information to define the current execution environment for the current running process of processor 32.

Processor 32 has a current privilege level represented by a current privilege level field (PSR.cpl) 46A in PSR 46. The current privilege level stored in PSR.cpl field 46A controls accessibility to system resources in processor 32, such as the system registers in system register set 44, system instructions, and system memory pages. The current privilege level stored in PSR.cpl field 46A varies between two or more execution privilege levels. In one embodiment of computer system 30, four levels of privilege are employed, with privilege level 0 being the most privileged level, providing access to all privileged instructions, and privilege level 3 being the least privileged level. A call instruction stores the current privilege level from PSR.cpl field 46A into PFS.ppl 38A of PFS register 38.

Processor 32 can single-step through application instructions by enabling the single-step field (PSR.ss) 46B of PSR 46. When single-stepping is enabled, successful execution of an instruction results in a single-step trap.

System register set 44 includes control registers 47. Control registers 47 include an interruption status register (ISR) 48, an interruption vector address (IVA) register 50, and an interruption processor status register (IPSR) 51. ISR 48 receives information from processor 32 related to the nature of an interruption. ISR 48 contains information about the excepting instruction and its properties, such as whether the excepting instruction was performing a read, write, execute, speculative, or non-access operation. Fault and trap specific information is stored in a code field (ISR.code) 48A of ISR 48. IVA register 50 specifies a base address of interruption vector table (IVT) 62 (discussed below). IPSR 51 receives the value of PSR 46 on an interruption. IPSR 51 is used to update PSR 46 after a return from interruption. Like PSR 46, IPSR 51 includes a current privilege level (cpl) field 51A, and a single-step (ss) field 51B.

Memory 52 stores a privilege desiring application program 54 having application instructions. In one embodiment, application program 54 is an operating system. Memory 52 also stores a privilege promotion process 56 and a privilege demotion process 58. Operating system 60, which is stored in memory 52, includes IVT 62. IVT 62 stores a plurality of interruption handlers. IVT 62 stores general exception handler 62A and single-step trap handler 62B. In addition to using IVT 62 to handle particular interruptions, other interruptions may be handled by other processes.

An interruption is an event that causes the hardware to automatically stop execution of the current instruction stream, and start execution at an instruction address corresponding to an interruption handler for that interruption. Interruptions include faults and traps. A fault occurs when operating system intervention is required before the current instruction can be executed. A trap occurs when operating system intervention is required after the current instruction has completed. Interruptions are handled by operating system 60 at an address determined by the base location of IVT 62 (specified by IVA register 50), offset by an amount based on the particular interruption that occurred. Each interruption has its own architected offset into IVT 62.

When an interruption occurs, processor 32 stops execution at the current instruction pointer (IP), sets the current privilege level to 0 (PSR.cpl 46A=0), and begins fetching instructions from the address of the entry point to the interruption handler in IVT 62 for the particular interruption that occurred. Interruption handlers may be contained entirely within IVT 62, or handlers may branch to code outside IVT 62 if more space is needed.

The location of interruption handlers within IVT 62 is specified by an interruption vector. In one embodiment, there are more interruptions than there are interruption vectors in IVT 62. Thus, there is a many-to-one relationship between interruptions and interruption vectors. A handler associated with a particular interruption vector can determine the particular interruption that occurred by reading ISR.code 48A. After an interruption has been processed by an interruption handler, a return from interruption (rfi) instruction is executed by processor 32, and previously stored processor state information is used to restore the processor state.

In one embodiment, processor 32 generates a general exception interruption vector when a privileged operation fault occurs. Based on the base address of IVT 62 contained in IVA register 50, and the offset associated with the general exception interruption vector, processor 32 jumps to general exception handler 62A to handle the privileged operation fault. General exception handler 62A is discussed in further detail below.

In one embodiment, processor 32 generates a single-step trap interruption vector when a single-step trap occurs. Based on the base address of IVT 62 contained in IVA register 50, and the offset associated with the single-step trap interruption vector, processor 32 jumps to single-step trap handler 62B to handle the single-step trap. Single-step trap handler 62B is discussed in further detail below.

Processor 32 would typically execute a privilege desiring application program, such as application program 54, at a low current privilege level (e.g., PSR.cpl–2). The current privilege level stored in PSR.cpl field 46A controls the application program 54 instruction execution in computer system 30 by controlling accessibility to system resources, such as system registers in system register set 44, system instructions, and memory pages of memory 52. If processor 32 attempts to execute an instruction in application program 54 that requires a higher privilege level (e.g., PSR.cpl=0), a privileged operation fault occurs.

Figure 2:
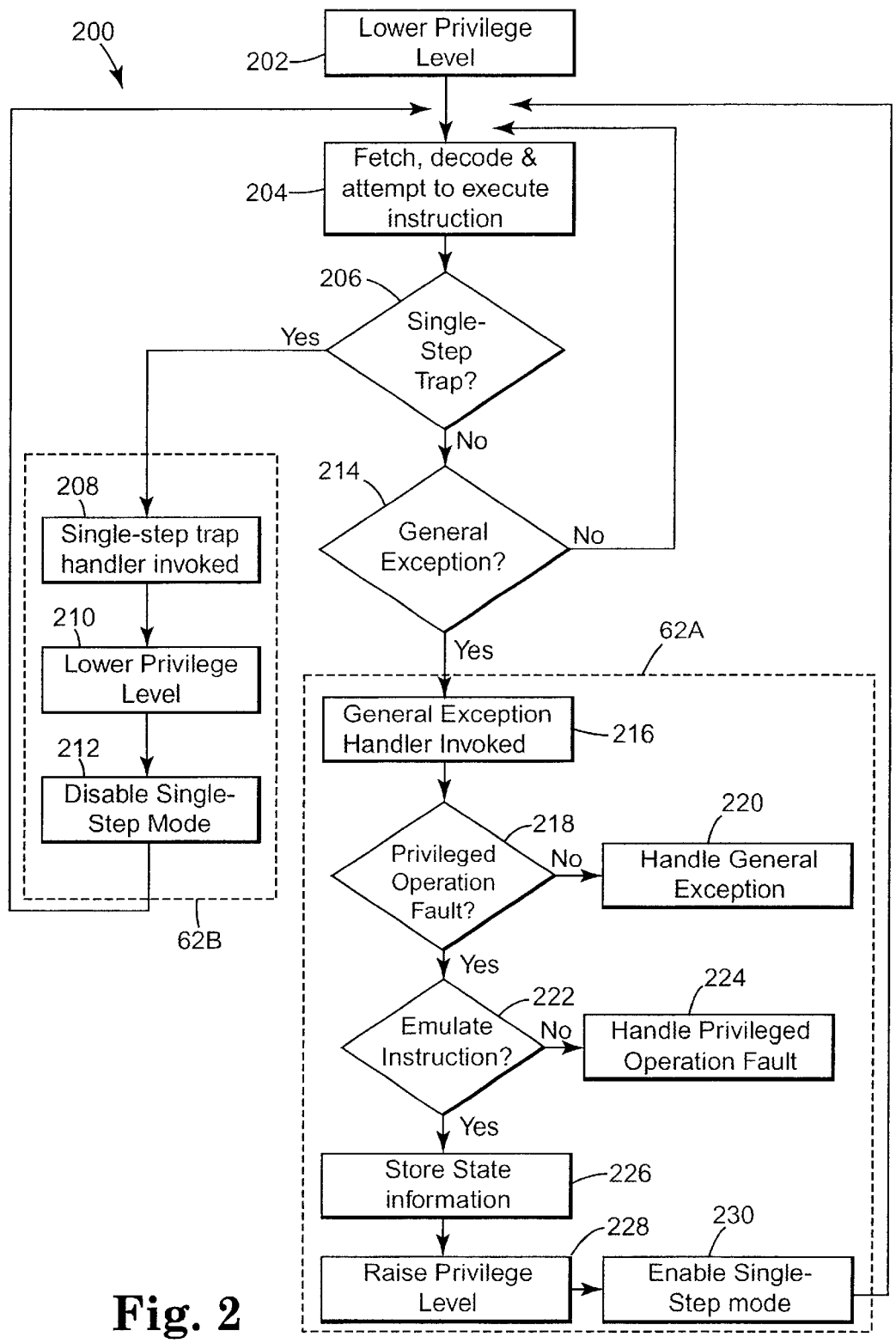
FIG. 2 is a flow diagram illustrating a process for monitoring the execution of privileged instructions in a privilege desiring application program according to the present invention.

FIG. 2 illustrates a flow diagram of a process 200 for monitoring the execution of privileged instructions in privilege desiring application program 54 according to the present invention. In step 202 of process 200, processor 32 lowers the current privilege level. In one embodiment, processor 32 lowers the current privilege level by executing privilege demotion process 58. A "lowering" of the privilege level in the present invention, involves raising the value in PSR.cpl 46A, since higher numbers in PSR.cpl 46A correspond to lower privilege levels.

Figure 3:
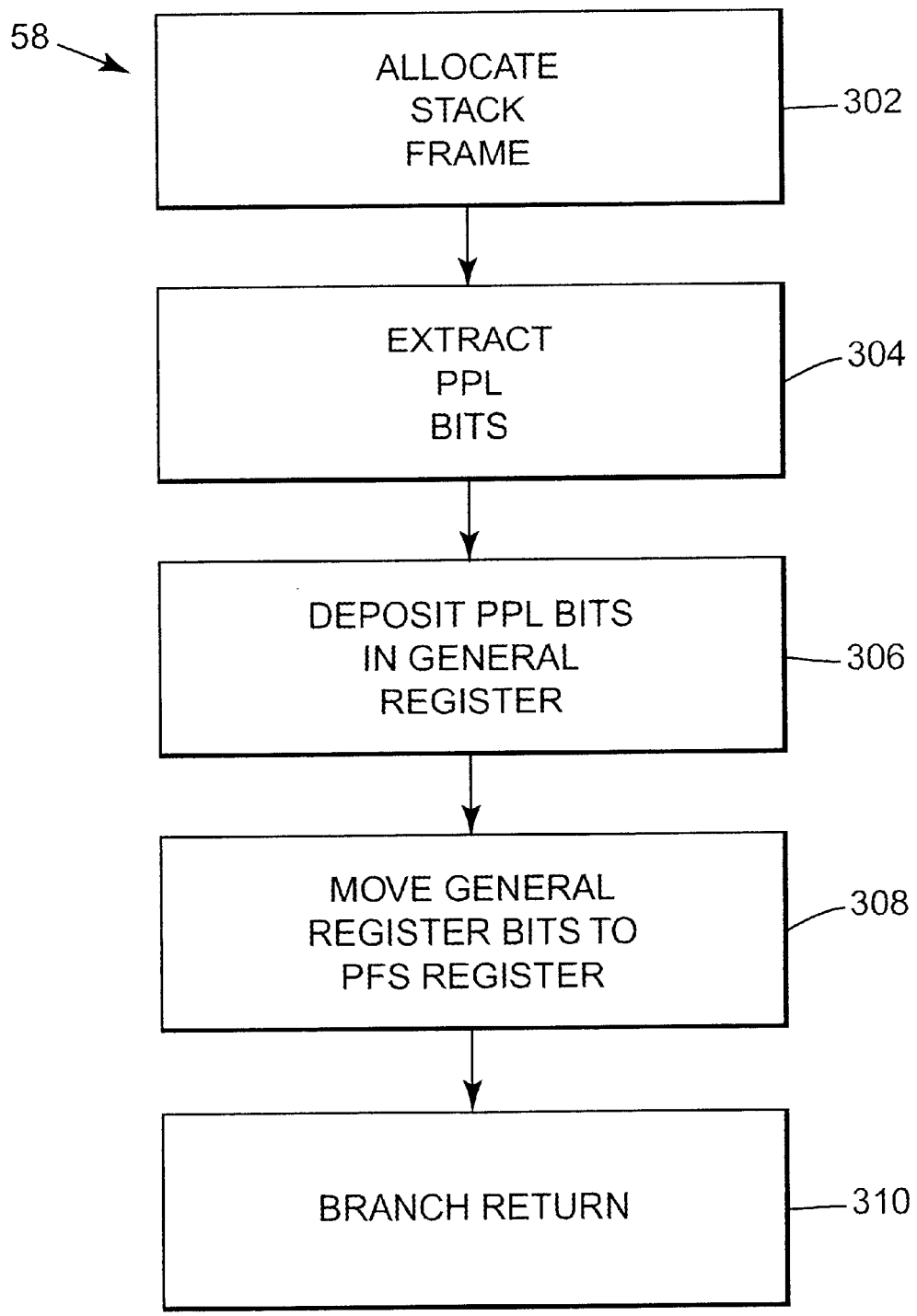
FIG. 3 is a flow diagram illustrating one embodiment of a privilege demotion process.

FIG. 3 illustrates the steps taken by processor 32 in one embodiment during execution of privilege demotion process 58. In step 302, processor 32 allocates a stack frame on a general register stack, including two stacked general registers 40 and 41. During the allocation, processor 32 copies the contents of PFS register 38 to stacked general register 40. In step 304, processor 32 extracts the ppl field 38A from stacked general register 40, and places the extracted ppl field 38A in static general register 42. Since in one embodiment, static general register 42 is visible to all procedures, other procedures may access general register 42 to determine the privilege level specified therein. The contents of general register 42 are returned to the process that called privilege demotion process 58. Next, in step 306, processor 32 deposits selected bits corresponding to the desired lower privilege level from stacked general register 41 to stacked general register 40. In one embodiment, bits corresponding to a privilege level of 2 are stored in general register 41 and deposited in stacked general register 40. Other bit combinations corresponding to other privilege levels may be stored in stacked general register 41 and deposited in stacked general register 40. The bits corresponding to the desired privilege level are stored in stacked general register 41 by the call to privilege demotion process 58, which specifies the desired privilege level. In step 308, processor 32 moves the contents of stacked general register 40, including the newly set privilege level bits, to PFS register 38. After the move, PFS.ppl 38A contains bits corresponding to the desired lower privilege level. In step 310, processor 32 performs a branch return instruction. During the branch return instruction, processor 32 updates PSR.cpl 46A with the value from PFS.ppl 38A, thereby setting the desired lower privilege level in PSR.cpl 46A.

Next, as shown in FIG. 2, after the current privilege level is lowered to the desired value in step 202, processor 32 fetches, decodes and attempts to execute an instruction from privilege desiring application program 54 in step 204. In step 206, if the single-step trap field (PSR.ss 46B) is enabled, successful execution of the instruction results in a single-step trap, and the single-step trap handler 62B is invoked in step 208 (discussed below). If the attempted execution of the instruction results in the generation of a general exception interruption vector, general exception handler 62A is invoked in step 216. If neither a single-step trap nor a general exception interruption vector is generated, process 200 jumps to step 204, and the next instruction is fetched, decoded, and execution of that instruction is attempted.

When invoked in step 216, general exception handler 62A determines in step 218 whether the general exception interruption vector was generated due to a privileged operation fault. In one embodiment, general exception handler 62A makes the determination by reading ISR.code 48A. If ISR.code 48A indicates that the general exception interruption vector was not generated due to a privileged operation fault, general exception handler 62A handles the general exception in the normal manner in step 220. If ISR.code 48A indicates that the general exception interruption vector was generated due to a privileged operation fault, process 200 jumps to step 222.

At step 222, general exception handler 62A determines whether the current instruction should be "emulated." The word "emulated" in this context does not represent the traditional software-based emulation. Rather, processor 32 essentially performs the equivalent of an emulation of an instruction by temporarily modifying privilege levels to actually execute the instruction. In one embodiment, general exception handler 62A makes the determination of whether the current instruction should be emulated based on whether a user mode has been specified by operating system 60. In one embodiment, a user mode indicates that the application program is running at privilege level 3 (i.e., PSR.cpl=3). If a user mode has not been specified, general exception handler 62A handles the privileged operation fault in the normal manner in step 224. If a user mode has been specified, general exception handler 62A jumps to step 226. At step 226, general exception handler 62A stores state information 64 in memory 52. In one embodiment, state information 64 includes processor state information as specified in PSR 46. State information 64 preferably also includes any information that may be helpful in later analyzing the privileged operation fault, including which instruction caused a fault, what the state of processer 32 was when a privilege fault occurred, the number of privilege faults that occurred during execution of privilege desiring application program 54, as well as other information.

Figure 4:
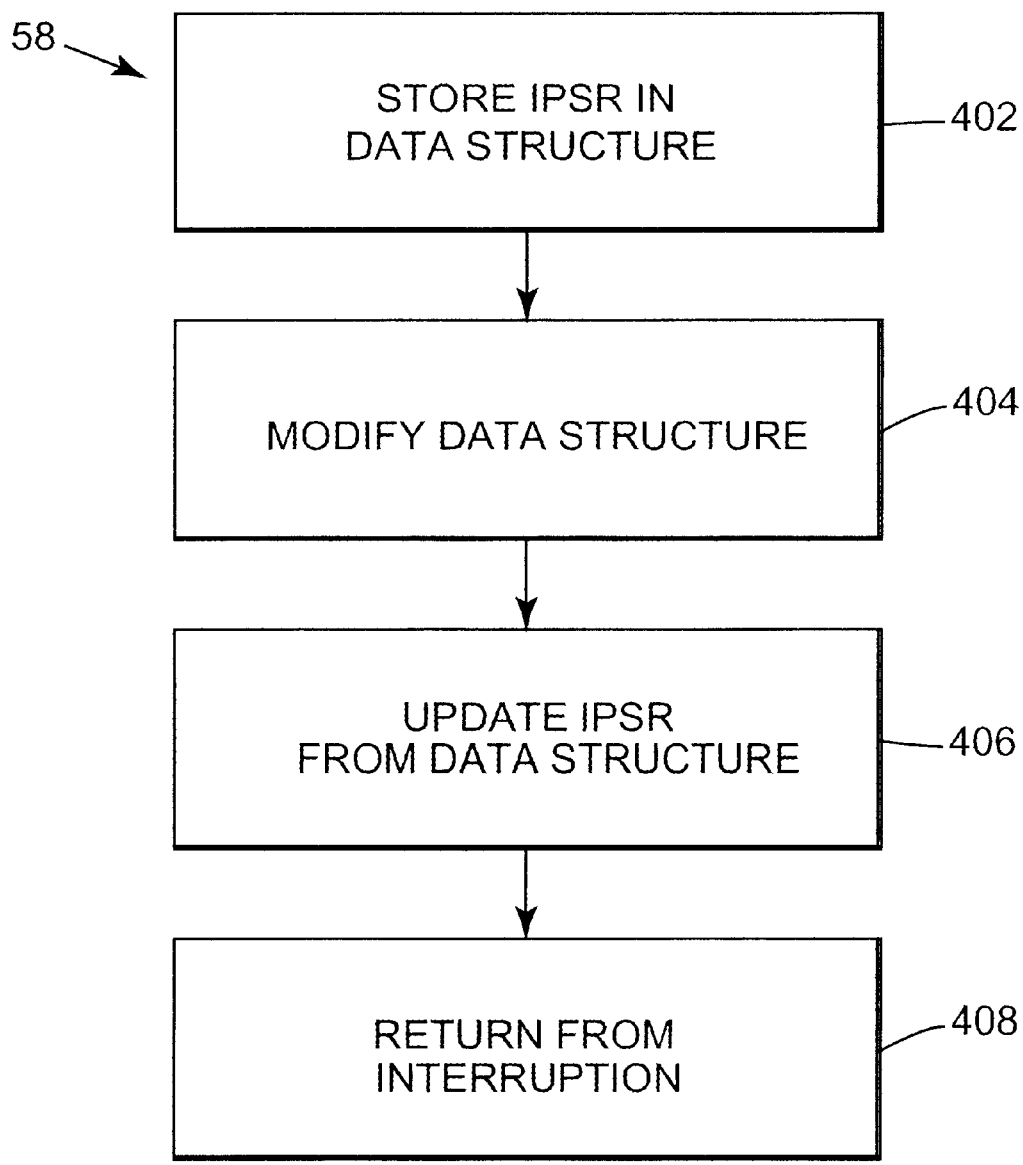
FIG. 4 is a flow diagram illustrating one embodiment of a privilege promotion process.

Next, in step 228, general exception handler 62A raises the current privilege level of processor 32 stored in PSR.cpl field 46A by executing privilege promotion process 56. FIG. 4 shows a flow diagram of one embodiment of a privilege promotion process 56. Privilege promotion process 56 includes step 402 of storing the value of IPSR.cpl 51A in a data structure. In step 404, the value in the data structure representing IPSR.cpl 51A is changed to the desired higher privilege level value (e.g., 0). In step 406, IPSR 51 is updated based on the data stored in the data structure. After the updating has been performed, IPSR.cpl 51A contains the desired higher privilege level (e.g., IPSR.cpl 51A=0). In step 408, a return from interruption (rfi) is performed. A return from interruption causes PSR 46 to be updated from IPSR 51. Thus, after the return from interruption, PSR.cpl 46A contains the desired higher privilege level (e.g., PSR.cpl 46A=0).

Lastly, as shown in FIG. 2, in step 230, general exception handler 62A enables single-step mode. General exception handler 62A enables single-step mode by enabling the single step field PSR.ss 46B in PSR 46. In one embodiment, general exception handler 62A enables single step field PSR.ss 46B in the same manner and in the same process as general exception handler 62A modifies PSR.cpl field 46A (discussed above with reference to FIG. 4). Specifically, in step 402, general exception handler 62A stores the value of IPSR.ss 51B in a data structure. In step 404, the value in the data structure representing IPSR.ss 51B is then changed to enable single-stepping. In step 406, IPSR 51 is updated based on the data stored in the data structure. After the updating has been performed, IPSR.ss 51B=1. In step 408, a return from interruption (rfi) is performed. A return from interruption causes PSR 46 to be updated from IPSR 51. Thus, after the return from interruption, PSR.ss 46B contains the desired value (e.g., PSR.ss 46B=1).

Next, flow returns to step 204 to execute the current instruction. After execution of the current instruction, since the single-step trap field PSR.ss 46B has been enabled, a single-step trap is generated at step 206, and single-step trap handler 62B is invoked at step 208. In step 210, single-step trap handler 62B lowers the current privilege level stored in PSR.cpl field 46A using privilege demotion process 58, shown in FIG. 3 and discussed above. In step 212, single-step trap handler 62B disables single-stepping. In one embodiment, single-step trap handler 62B disables single-stepping by disabling single-step trap field PSR.ss 46B in PSR 46 in the same manner, discussed above, as PSR.ss 46B is enabled. In one embodiment, single-step trap handler 62 also stores state information 64, including the current state of PSR 46 prior to any modifications by single-step trap handler 62B. Flow is then returned to step 204, where the next instruction is fetched, decoded, and execution of the instruction is attempted.

The present invention is not limited to one type of processor, but rather applies to any processor that provides single-step and interruption functionality, including, but not limited to, an IA-64 processor architecture.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of monitoring the execution of privileged instructions by a processor of a computer system, the processor including a current privilege level, the processor automatically generating a fault when attempting execution of an instruction requiring a higher privilege level than the current privilege level of the processor, the method comprising:

raising the current privilege level of the processor in response to a fault generated by a first faulting instruction;

executing the first faulting instruction;

generating a trap by executing the first faulting instruction; and lowering the current privilege level of the processor in response to the trap.

2. The method of claim 1, and further comprising:

lowering the current privilege level of the processor before executing the instructions.

3. The method of claim 1, and further comprising:

invoking a fault handler to process the fault.

4. The method of claim 3, wherein the step of raising the current privilege level is performed by the fault handler.

5. The method of claim 1, and further comprising:

invoking a trap handler to process the trap.

6. The method of claim 5, wherein the step of lowering the current privilege level is performed by the trap handler.

7. The method of claim 1, and further comprising:

enabling a single-step mode of the processor in response to the fault.

8. The method of claim 7, and further comprising:

setting a field in a system register of the processor to enable the single-step mode.

9. The method of claim 1, and further comprising:

storing state information in response to the fault.

10. The method of claim 9, wherein the state information includes the number of instructions that caused a fault and an identification of instructions that caused a fault.

11. A method of executing instructions by a processor of a computer system controlled by an operating system, the processor having a current privilege level, the method comprising:

generating a privileged operation fault based on the attempted execution of a first instruction;

raising the current privilege level of the processor in response to the privileged operation fault;

enabling a single-step mode in response to the privileged operation fault;

executing the first instruction, thereby generating a single-step trap;

lowering the current privilege level of the processor in response to the single-step trap; and disabling the single-step mode in response to the single-step trap.

12. The method of claim 11, and further comprising:

lowering the current privilege level of the processor before executing the instructions.

13. The method of claim 11, and further comprising:

invoking a fault handler to process the privileged operation fault.

14. The method of claim 13, wherein the steps of raising the current privilege level and enabling a single-step mode are performed by the fault handler.

15. The method of claim 11, and further comprising:

invoking a trap handler to process the single-step trap.

16. The method of claim 15, wherein the steps of lowering the current privilege level and disabling the single-step mode are performed by the trap handler.

17. The method of claim 11, and further comprising:

setting a field in a system register of the processor to enable the single-step mode.

18. The method of claim 11, and further comprising:

storing state information in response to the privileged operation fault.

19. The method of claim 18, wherein the state information includes the number of instructions that caused a fault and an identification of instructions that caused a fault.

20. A computer system comprising:

a processor having a current privilege level that controls application instruction execution in the computer system;

a memory storing a privilege desiring application program having application instructions; and an operating system stored in the memory for controlling the processor, the operating system including a fault handler and a trap handler, the fault handler raising the current privilege level and enabling a single-step mode in response to a privileged operation fault, the trap handler lowering the current privilege level and disabling the single-step mode in response to a single-step trap.

21. The computer system of claim 20, wherein the fault handler stores state information in the memory.

22. The computer system of claim 21, wherein the state information includes the number of instructions that caused a fault and an identification of instructions that caused a fault.

23. A computer readable medium containing instructions for an operating system for controlling a processor of a computer system to perform a method of monitoring the execution of privileged instructions, the processor having a current privilege level that controls instruction execution in the computer system, the method comprising:

raising the current privilege level of the processor in response to a fault generated by a first faulting instruction;

executing the first faulting instruction;

generating a trap by executing the first faulting instruction; and lowering the current privilege level of the processor in response to the trap.

24. The computer readable medium of claim 23, wherein the method further comprises:

lowering the current privilege level of the processor before executing the instructions.

25. The computer readable medium of claim 23, wherein the method further comprises:

invoking a fault handler to process the fault.

26. The computer readable medium of claim 25, wherein the step of raising the current privilege level is performed by the fault handler.

27. The computer readable medium of claim 23, wherein the method further comprises:

invoking a trap handler to process the trap.

28. The computer readable medium of claim 27, wherein the step of lowering the current privilege level is performed by the trap handler.

29. The computer readable medium of claim 23, wherein the method further comprises:

enabling a single-step mode of the processor in response to the fault.

30. The computer readable medium of claim 29, wherein the method further comprises:

setting a field in a system register of the processor to enable the single-step mode.

31. The computer readable medium of claim 23, wherein the method further comprises:

storing state information in response to the fault.

32. The computer readable medium of claim 31, wherein the state information includes the number of instructions that caused a fault and an identification of instructions that caused a fault.

* * * * *